Inventor

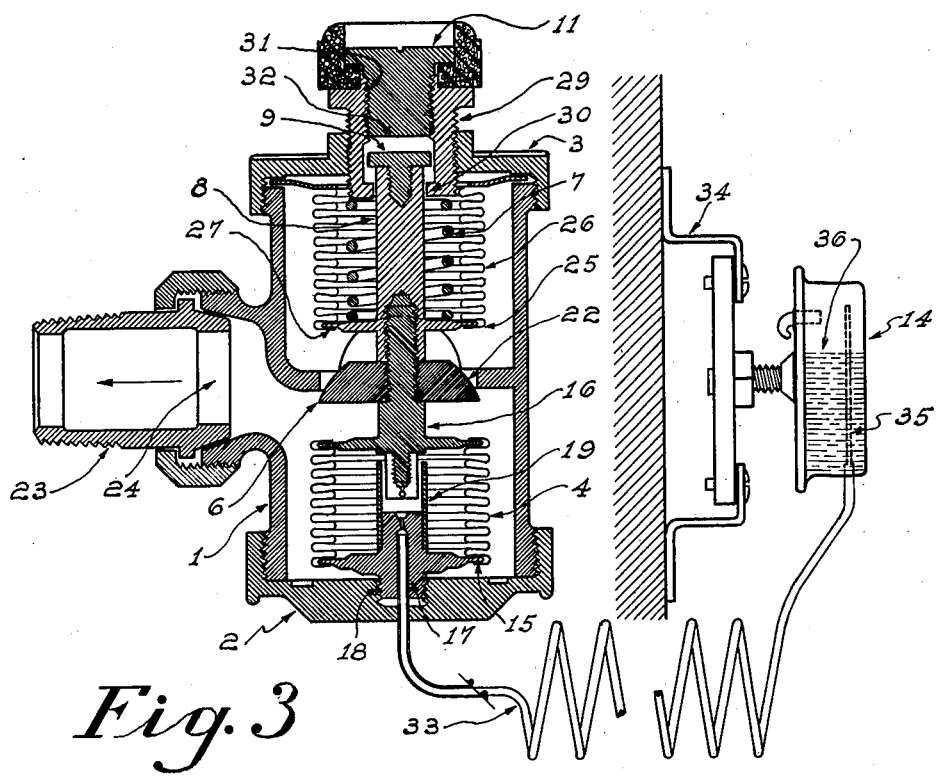

Patented Mar. 1, 1932

1,847,911

UNITED STATES PATENT OFFICE

REUBEN N. TRANE, OF LA CROSSE, WISCONSIN

THERMOSTATICALLY CONTROLLED VALVE

Application filed September 19, 1930. Serial No. 483,021.

My invention relates to a thermostatically controlled valve wherein a thermostat positioned in the medium, the temperature of which is to be controlled, creates a sufficient vapor pressure to actuate and move means for controlling the flow of the heating medium.

One of the objects of my invention is to provide an automatic thermostatic valve which will accurately close and open the valve of a radiator at predetermined temperatures.

Another object of my invention is to have all the elements of this thermostatic valve within the valve body itself with the exception of the thermostat.

Another object of my invention is to provide a thermostat far enough from the radiator so as not to be influenced by the heat of the radiator and at the same time delicate enough to have a small change in temperature produce enough power to move the valve throttle. To accomplish this I prefer to use a container partly filled with a volatile liquid positioned away from the influence of wall temperature or radiator temperature, and I prefer the liquid to be one which vaporizes— at a low temperature, ethyl chloride for instance, and which at various temperatures around 70 will produce a vapor pressure in the container approximating five pounds.

Another object of my invention is to allow this vapor pressure to act directly upon the valve throttle with a minimum of influence from other factors such as the heat of the steam in valve. To accomplish this I prefer to use a metallic bellows consisting of enough corrugations to give the bellows power and flexibility as a motor vessel and to enclose the bellows in the valve body.

I am familiar with the Fulton U. S. Patent No. 1,404,844 which discloses a vapor actuated bellows, the bellows being continuously heated by a steam by-pass which was expensive and impractical to be used in connection with a radiator valve where space, cost and appearance are important factors.

I am also familiar with the Halsey U. S. Patent No. 1,285,990 which discloses a diaphragm disc operated by vapor pressure, but a disc as there disclosed is not as powerful or sensitive to changes in vapor pressure as the metallic bellows with many corrugations.

Another object of my invention is to provide means in the container to keep the liquid in the container, and at the same time causing the transmission of the vapor pressure to the motor vessel. In many instances a coil of tubing will work satisfactorily.

Another object of my invention is to produce a cheap valve and at the same time provide for easy adjustment of the valve and the detaching of various parts for replacement and examination. To accomplish this I have made the valve with two chambers, open at either end, which ends are closed by detachable bonnets upon which are mounted the valve actuating elements.

Another object of my invention is to avoid the use of stuffing boxes and to accomplish this I place the motor vessel or bellows within the valve and supply the vapor through a conduit through the wall of the bonnet.

Another object of my invention is to provide a flexible valve throttle mounted on one of the valve actuating forces.

Another object of my invention is to provide a force within the valve body which at predetermined temperatures of the medium surrounding the thermostat will balance the force of the vapor in the motor vessel so as to cause the valve throttle to remain stationary and which, at any lower temperature with consequently less vapor pressure, will move the valve throttle away from the valve seat.

Another object of my invention is to provide an easy means for adjusting the force mentioned in the last paragraph, which I do through an adjustable boss threaded into one of the bonnets of the valve.

Another object of my invention is to provide means governing within predetermined limits the amount of movement of the forces on either side of the valve throttle.

Another object of my invention is to provide a motor vessel within the bellows moving the valve throttle without being influenced by the steam pressure in the valve.

The various features of novelty which characterize my invention are pointed out in claims annexed to and forming a part of this specification.

In the accompanying drawings which illustrate my invention, Figure 1 is a vertical cross section view of the valve with the connecting tube and thermostat.

Figure 3 is a vertical cross section of the valve showing the actuating stem in operative engagement with the valve throttle.

Figure 1:
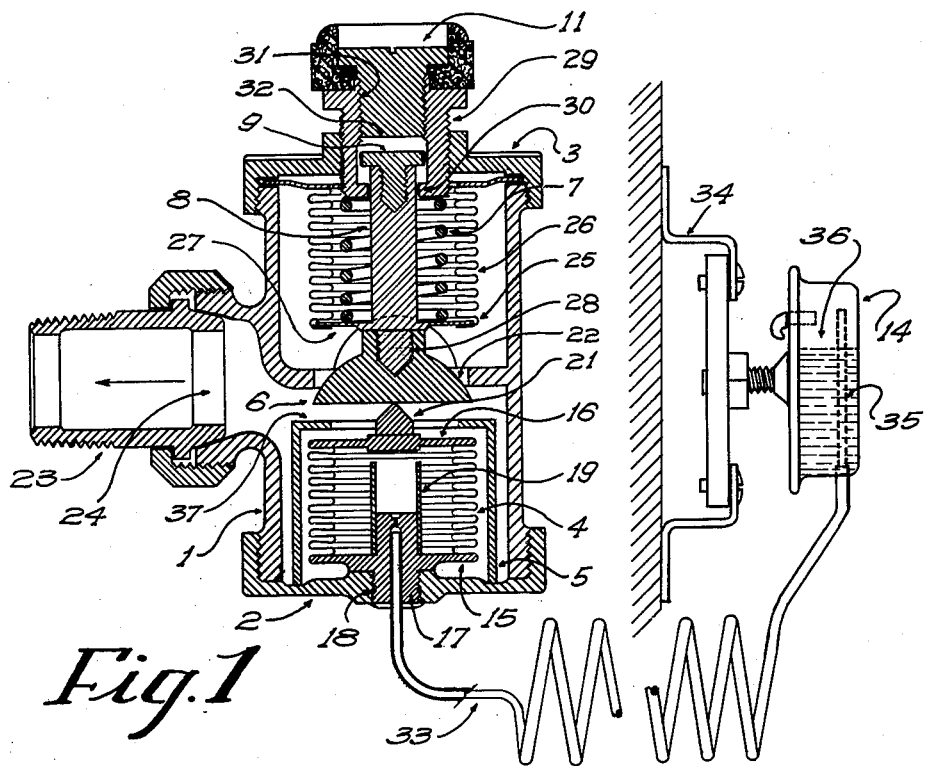

Referring to Figure 1, 1 is the body of the trap on which are mounted the bonnet 2 and the bonnet 3. On the interior of the body 1 is corrugated metal bellows 4 mounted at one end on a circular flange 15 and at the other end to a metal disc 16. On the exterior of the flange 15 is mounted a threaded boss 17 which is threaded into the bonnet 2 at 18. On the interior of the flange 15 is mounted a cylindrical stop 19 which extends a predetermined distance toward the disc 16 and prevents the collapse of the bellows beyond a predetermined amount.

Figure 2:
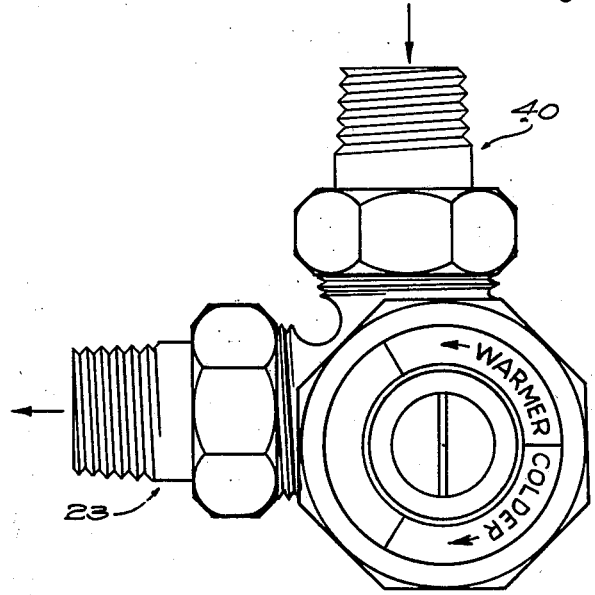
Figure 2 is a top view of the exterior of the valve.

On the exterior and in the center of the disc 16 is mounted a short conical shaped valve stem 21 which contacts with the valve throttle 6, which opens and closes on the seat 22 to control the passage of steam in the direction of the arrow from 40 (in Figure 2), opening into chamber 25 through the valve into chamber 24 and through outlet 23 (in Figure 2). The seat further divides the valve body 1 into two separate chambers, 24 and 25. Within the chamber 25 is a bellows 26 with its open end toward the bonnet 3. A disc 27 is mounted on the bellows 26 to make a closed end, proximate the valve seat, and on the disc 27 is mounted the valve throttle 6 by means of the threaded boss 28 which is attached to the stem 8, the movement of which is restricted by the annular flange 9 and the flange 30. A collar 29 is threaded into the bonnet 3 and on one end of the collar 29 is an interiorly turned annular flange 30 adapted to restrict the movement of the stem 8 in the direction toward the valve seat, and when the flange 30 is moved away from the valve seat it will operate to close the valve.

The cap 11 is threaded into the collar 29 by means of the threaded boss 31 so that the axial movement of the stem 8 is restricted by the end 32 of the boss 31 in one direction and by the flange 30 in the other direction, so that the axial movement of the stem 8 is restricted to the distance between the flange 30 and the end 32 of the boss 31.

Rotation of the cap 11 and the coincident rotation of the collar 29 adjust the limits of motion of the stem 8 by moving the flange 30 and the boss 31, at the same time keeping constant the limit of motion.

A spiral spring 7 of predetermined strength bears against the collar 29 and the movable disc 27 which tends to move the valve throttle 6 away from the valve seat 22, thus tending to keep the valve open.

By rotation of the cap 11 and collar 29 to the left, the flange 30 will engage the flange 9 and close the valve, while by rotation of the cap 11 to the right the end 32 of the boss 31 will contact the stem 8 moving the stem 8 so as to open the valve, all of which may be done manually should the valve be ineffective for any reason. Also, the movement of the collar 29 towards the valve seat 22 will tend to compress the spring 7 which increases the force tending to keep the valve open, and in this manner the operation of the valve may be adjusted. In the beginning the force of the spring is adjusted so that while the normal position of the valve is open, nevertheless a measured amount of force will close the valve.

Flexible hollow tubing 33 is connected to the interior of the bellows 4 through a conduit extending axially through the boss 17, and the tubing 33 is connected to a remote bulb 14 which is charged with a predetermined amount of ethyl chloride or other volatile liquid with low boiling point. The bulb 14 preferably is mounted on the wall of a room, and to avoid the influence of the temperature of the wall upon the bulb 14, the bulb 14 is mounted on the bracket 34 spaced away from the wall. The tubing 33 extends into the bulb 14 and nearly to the upper side of the bulb as shown by the dotted portion of the tube 35, and when mounted the extended portion 35 is preferably approximately vertical so that the end of the tube 35 is above the level 36 of the liquid in the bulb 14.

A cylindrical metal casing 5 is mounted inside the valve body 1 on the bonnet 2. The end wall 37 of the metal casing 5 has an aperture 38 through which projects the valve stem 21. The casing 5 acts to protect the bellows 4 and also serves to guide the motion of the bellows, and the end wall 37 is spaced from the disc 16 to allow a predetermined and limited motion of the bellows should the bellows be removed from the valve body for any reason.

In the operation of my invention the spring 7 is adjusted by means of the cap 11 so that the valve 6 is forced off the valve seat 22 and the normal position of the valve is open at any temperature below the predetermined and desired temperature of the air in the room. The bulb 14 is filled with a predetermined amount of ethyl chloride so that at a predetermined temperature there will be sufficient expansion and resultant force or pressure within the bellows 4 to move the valve stem 21 against the valve throttle 6, tending to close it on the seat 22, and with sufficient force to balance the opposing force of the spring 7. It is apparent that at any more than the predetermined temperature the pressure within the bellows 4 will overcome the force of the spring 7 and close the valve, while at anything less than the predetermined temperature the valve will remain open. In actual practice this valve will open and close within limits of two degrees. For example, if the predetermined and desired temperature is 70°, the valve will be open when the temperature of the air or liquid surrounding the bulb 14 is 69° and closed when the temperature is raised to 71°. It is also apparent that the bellows 4 is intermittently exposed to the heat of steam, but with the use of ethyl chloride the contents of the bellows 4 will be a gas and not a liquid. Temperature changes have less effect as to volume and pressure upon a gas than upon a liquid and these temperature changes can be compensated for within narrow limits.

There are certain difficulties which have been solved by my invention which make it possible to use a vapor actuated bellows within the body of a valve with the bellows exposed to constant or intermittent steam pressure.

For illustration, supposing the steam pressure in the valve ranges from a sub-atmospheric pressure to a pressure less than five pounds, it is obvious that this steam pressure, if above atmosphere, will normally tend to move the vapor actuated bellows 4 away from the valve throttle 6 and if sub-atmospheric, the pressure will tend to move the valve throttle toward the valve seat, consequently serving to destroy the efficiency and accuracy of the valve. To prevent this I create an initial vapor pressure in the bellows 4, greater than the steam pressure, tending to move the throttle 6 in one direction, and I oppose this initial vapor pressure with another equivalent force tending to move the throttle 6 in the opposite direction so that the resultant is zero. The face of the throttle 39 being of equal area to the end piece 16 of the bellows 4, the steam pressure, if less than the pressure in the bellows 4, will exert equal pressures in opposite directions on the face 39 of the throttle 6 and upon the end of the bellows 16. This condition is created at the predetermined temperature of the medium to be controlled, such as air, and at all other temperatures the pressures or force of the spring 7 and the bellows 4 will be unequal. Also, the pressure of the steam on the end of the bellows will be opposed to the vapor pressure in the bellows, and the pressure of the steam on the face of the throttle will be opposed by the pressure tending to move the throttle off the seat, but the steam pressure will fail to move the bellows 4 or the throttle 6 as long as the steam pressure is less than the opposing vapor pressure in the bellows, or less than the pressure or force exerted by the spring 7.

To illustrate, if the steam pressure is less than five pounds, the initial vapor pressure in the motor vessel 4, at the desired and predetermined temperature, is created at five pounds tending to move the throttle on the seat, and an opposing force is created in this case by spring 7 of five pounds, tending to move the throttle away from the seat. The resultant of these forces is zero. With a steam pressure of two pounds, a pressure of two pounds will be exerted on the end of the bellows 4 tending to move it away from the valve throttle, and the same pressure of two pounds will be exerted on the throttle 6 tending to move the throttle 6 away from the motor vessel 4, but the steam pressure of two pounds is ineffective in opposition to either of the said five pound forces so that there is no movement of the throttle 6 or motor vessel 4 due to steam pressure at pressures less than five pounds. When the steam pressure exceeds the vapor pressure in the motor bellows 4, the apex of the conical stem 21 will be forced from contact with the face 39 of the throttle 6.

It is obvious that the initial vapor pressure and equivalent opposing force may be created greater than predetermined steam pressures, limited only by ability to create requisite vapor pressure and spring pressure. Most heating systems are operated at sufficiently low pressures, that no difficulty is encountered in this. It is desirable to use as small initial pressures in the motor vessel 4 as possible, because the opposing force when called upon to exert a small initial force (such as a spring) is more sensitive and accurate, than when exerting a larger initial force.

It is also desirous that the operative contact between the motor vessel and the throttle be of such construction, that the movement of the valve actuating stem will not cause binding of the valve throttle or improper seating. Frequently motor vessels such as metallic bellows are inaccurate in successive axial movements so that if the motor bellows were operatively engaged to the throttle, the throttle might not always seat correctly, thus impairing the efficiency of the valve. To avoid this I use a conical actuating stem with its apex in operative contact with the face of the throttle so that axial movement of the bellows, even if inaccurate, toward the throttle will cause the throttle to seat correctly.

The actuating stem 21 might also be in operative engagement with the valve throttle 6, in which case the valve would be operatable even though the steam pressures exceeded the initial pressure in the motor vessel, but provision must be made to insure correct seating of the valve and easy operation.

My invention is not confined to valves controlling the supply of steam, but it is evident it may be applied to valves controlling liquids or other gases with equal success.

It is apparent that if there is a pressure of five pounds in the motor bellows 4 at, for example, the temperature of 70° which is the desired temperature of the medium, the temperature of which is to be controlled, that upon a decrease in the temperature there will be a reduction of pressure in the motor bellows 4 due to a condensation of a portion of the vapor in the thermostat.

The mechanical force exerted by the spring 7 of five pounds opposing the pressure in the motor bellows 4, now being greater than the pressure in the motor bellows 4, the throttle 6 will be moved away from the valve seat 22 so that at all temperatures less than the predetermined temperature the valve throttle 6 will be open. At all temperatures above the predetermined temperature the vapor pressure in the motor bellows 4 will be increased over the initial pressure created at the predetermined temperature, and will exceed the mechanical force exerted by the spring 7, opposing the pressure in the motor bellows 4, and will move the throttle 6 upon the valve seat 22.

The valve will work equally well regardless of whether the steam inlet is into the chamber 25 or the chamber 24, but I prefer the inlet to be into the chamber 25, in which case there is no steam pressure exerted on the bellows 4 when the valve is closed.

A liquid in the container is selected which will at predetermined temperatures create a vapor which will exert a pressure greater than the steam pressure used, so that at all times there would be a saturated vapor pressure present in the bellows 4. It is not necessary for the bellows 4 to be heated and a vapor pressure may be created by vaporization of the volatile liquid in the container 14, which will operate the motor bellows 4.

Inasmuch as a liquid is selected which has a boiling point much lower than the desired or predetermined temperature, there would always be vapor pressure in the bellows 4, and as the temperature of the container 14, the tube 33, or the bellows 4 approached the predetermined or desired temperature, any condensation which had formed at a less temperature would be vaporized. The position of the opening of the tube 35 above the level of the liquid 36 will prevent the liquid from flowing into the tube 33.

It is also obvious that should steam heat the bellows 4, it would cause an inappreciable difference in the vapor pressure, due to the law of gases, such additional pressure being insufficient to interfere with the accuracy of the device due to the large initial pressure maintained at the predetermined temperature.

The air present in the bellows in manufacture is only partially exhausted and, for example at the temperature of 70°, the weight of the air is approximately one third of the weight of the saturated vapor of ethyl chloride. Air at ordinary operating temperatures is a non-condensible gas, and will tend to occupy its original position in the bellows 4 regardless of the law of gases that gas of equal or approximately equal density will mix.

The movement of the bellows 4 in one direction is limited by the position of the valve throttle 6 when seated and in the other direction is limited by the stop 19, while on the opposite side of the valve the movement of the stem 8 in one direction is limited by the position of the valve throttle 6 when seated and in the other direction by the flange 30, and the limit of movement on each side of the valve is equal.

The movement of the bellows 26 toward the valve seat 22 is actuated by the spring 7 positioned inside the bellows, the bellows being used, to avoid the necessity for packing, and for the support of the disc 27 which serves to balance the pressure of the steam against the curved portion of the valve throttle 6.

In Figure 3 of the drawings there is illustrated a modified form of throttle structure. In other respects the valve is similar to that shown in Figure 1.

While I have described in detail a preferred embodiment of my invention, it is understood that I am not limited to the details therein set forth except as defined by the following claims:

I claim:—

1. In a thermostatically controlled valve the combination of a valve body containing a valve seat and throttle and having inlet and outlet ports, a vapor actuated motor vessel within the body tending to move the throttle in one direction, an adjustable helical spring within the valve body tending to move the throttle in the opposite direction, said spring bearing against an adjustable boss mounted in a bonnet whereby the force of the spring may be balanced against the vapor force in the motor vessel at different temperatures, means mounted on the bonnet to limit the movement of the valve throttle within predetermined limits.

2. In a thermostatically controlled valve the combination of a valve body, two open ends of which are closed by detachable bonnets, a valve seat and throttle, and inlet and outlet ports, a vapor actuated motor vessel within the body tending to move throttle in one direction, an adjustable helical spring within the valve body tending to move the throttle in the opposite direction, said spring bearing against an adjustable boss mounted in a bonnet and also bearing against a movable wall of metallic bellows, one wall of which is stationarily mounted within the valve body and one wall of which is movably mounted in operative engagement with the valve throttle, means mounted on the bonnet to limit the movement of the valve throttle within predetermined limits.

3. In a thermostatically controlled valve the combination of a valve body containing a valve seat and throttle and having inlet and outlet ports, an expansible and collapsible vessel filled with a saturated gas wholly within the valve body in operative contact with the valve throttle, the head of said vessel being of substantially the same area as the adjacent face of said throttle, and an element carried by said throttle adjacent its opposite face and of substantially the same area as such face, whereby the surfaces of equal area above and below the throttle serve to balance it against variations in inlet and outlet pressures, a container partly filled with a volatile liquid and positioned in the medium, the temperature of which is to be controlled and operatively connected to said vessel by means of a tube opening into the space above the level of said liquid.

4. In a thermostatically controlled valve the combination of a valve body containing a valve seat and throttle and having inlet and outlet ports, means on opposite sides of said throttle and acting in opposition thereto under the influence of inlet and outlet pressures to balance the throttle against differential pressures within the valve body, a vapor actuated motor vessel within the body tending to move the throttle in one direction, an adjustable spring within the valve body tending to move the throttle in the opposite direction and means for adjusting the spring from a point exterior of the valve body whereby its force may be balanced against the vapor pressure in the motor vessel at different temperatures.

5. In a thermostatically controlled valve the combination of a valve body containing a valve seat and throttle and having inlet and outlet ports, a vapor actuated motor vessel within the body tending to move the throttle in one direction, an adjustable helical spring within the valve body abutting the throttle and tending to move it in the opposite direction, a bonnet on said valve body, an adjustable boss extending through said bonnet and in engagement with said helical spring to vary its compression and thereby to balance its force against the vapor pressure in the motor vessel at selected temperatures, and means mounted on the bonnet for limiting movement of the valve throttle within predetermined limits.

6. In a thermostatically controlled valve the combination of a valve body formed with inlet and outlet ports and having a valve seat therein, a valve throttle having a head cooperating with said seat and a stem contained within the valve body, a lateral flange on the end of said stem slidably received within the bore of an adjustable nipple which is formed with an inturned annular flange constituting a stop for limiting axial movement of the valve throttle in one direction, a helical spring surrounding said stem and abutting said adjustable nipple at one end thereby to force the throttle in one direction, a vapor actuated motor vessel within the valve body and in contact with the throttle to move it in opposition to the pressure of the said spring, and means for adjusting said nipple for varying the compression of said spring thereby to balance it against the vapor pressure in the motor vesel at different temperatures.

7. In a thermostatically controlled valve the combination of a valve body containing a valve seat and throttle and having inlet and outlet ports, a vapor actuated motor vessel within the body, tending to move the throttle in one direction, spring means within the valve body tending to move throttle in the opposite direction, elements carried by the throttle and motor vessel respectively with exposed surfaces of substantially the same areas as the upper and under faces of said throttle thereby to effect a balancing condition to inlet and outlet pressures of said valve so that the throttle will remain balanced irrespective of fluctuations in internal pressures.

8. In a thermostatically controlled valve, a valve body comprising two chambers one of which communicates with the inlet side of a heating system and the other with the outlet side of such system, a throttle adapted to establish or close communication between said chambers, spaced elements above and below said throttle, of areas substantially equal to those of the faces of the throttle and acting upon said throttle under the influence of the pressure of the heating medium in each chamber, respectively, to prevent movement of the throttle under the influence of varying pressures in said chambers, a vapor actuated motor mounted wholly within one of said chambers adapted to contact with said throttle, thermostatic means for increasing or decreasing the pressure in said motor thereby to move the throttle and means in said other chamber acting upon said throttle in opposition to said motor, whereby the throttle will respond to room temperature changes but be indifferent to pressure changes to which it is subjected within the system.

9. In a thermostatically controlled valve controlling the flow of heating medium, the combination of a valve body containing a valve seat, throttle, and an expansible and collapsible vessel filled with a gas maintained in a saturated or superheated condition by the heating medium, said vessel adapted to contact and move the valve throttle, a container with a volatile liquid therein supplying a saturated gas to said vessel through the pressure of such saturated gas, and means within the valve body on both sides of the valve seat to substantially balance the effect of the inlet and outlet differential on the throttle.

In witness whereof, I hereunto subscribe my name this 13th day of September, 1930.

REUBEN N. TRANE.